(12) United States Patent
Jiang et al.

(10) Patent No.: US 10,988,163 B2
(45) Date of Patent: Apr. 27, 2021

(54) POWER-ASSISTED STEERING MECHANISM OF ELECTRIC PALLET TRUCK

(71) Applicant: HANGCHA GROUP CO., LTD., Zhejiang (CN)

(72) Inventors: Zongping Jiang, Zhejiang (CN); Minglong Cai, Zhejiang (CN); Hao Kuang, Zhejiang (CN); Pengfei Pan, Zhejiang (CN)

(73) Assignee: HANGCHA GROUP CO., LTD., Zhejiang (CN)

( * ) Notice: Subject to any disclaimer, the term of this patent is extended or adjusted under 35 U.S.C. 154(b) by 219 days.

(21) Appl. No.: 16/191,469

(22) Filed: Nov. 15, 2018

(65) Prior Publication Data

US 2019/0367077 A1  Dec. 5, 2019

(30) Foreign Application Priority Data

Jun. 1, 2018 (CN) .......................... 201810558664.8
Jun. 1, 2018 (CN) .......................... 201820848918.5

(51) Int. Cl.
*B62D 5/04* (2006.01)
*B62B 3/00* (2006.01)
(Continued)

(52) U.S. Cl.
CPC ............ *B62D 5/0409* (2013.01); *B62B 3/001* (2013.01); *B62B 3/0612* (2013.01);
(Continued)

(58) Field of Classification Search
CPC ...... B62D 4/0409; B62D 7/02; B62D 5/0403; B62D 5/0418; B62B 3/001; B62B 3/0612;
(Continued)

(56) References Cited

U.S. PATENT DOCUMENTS 3,756,337 A * 9/1973 Schroeder .............. B62D 5/065
                                                  180/19.2
4,354,564 A * 10/1982 Watanabe ............ A01B 33/028
                                                  172/103
(Continued)

FOREIGN PATENT DOCUMENTS

| CN | 205836922 U | 12/2016 |
| DE | 20202940 U1 | 6/2002 |
| DE | 102005058944 A1 | 6/2007 |

OTHER PUBLICATIONS

DE102005058994 translation (Year: 2007).*
Search Report dated Jul. 17, 2019 for European patent application No. 18209371.6, 7 pages.

*Primary Examiner* — Anne Marie M Boehler
(74) *Attorney, Agent, or Firm* — Yue (Robert) Xu; Apex Attorneys at Law, LLP

(57) ABSTRACT

A power-assisted steering mechanism of an electric pallet truck includes an operating mechanism, a power assistor assembly, a driving mechanism and a mounting bracket. A handle and a handle seat of the operating mechanism are connected. The power assistor assembly includes a power assist mechanism and a controller. The power assist mechanism is electrically connected to the controller. An input shaft at an upper end of the power assist mechanism is drivably connected to a lower end of the handle seat. The mounting bracket includes a mounting plate and a mounting seat. An outer casing of the power assist mechanism is fixedly connected to the mounting plate. The driving mechanism includes a drive connecting shaft, a reduction gearbox, a driving wheel and a driving motor.

8 Claims, 1 Drawing Sheet

(51) Int. Cl.
 *B66F 9/075* (2006.01)
 *B62B 3/06* (2006.01)
(52) U.S. Cl.
 CPC ........ *B62D 5/0403* (2013.01); *B66F 9/07568* (2013.01); *B66F 9/07572* (2013.01)
(58) Field of Classification Search
 CPC .......... B62K 7/0007; B62K 2007/0092; B66F 9/075; B66F 9/07568; B66F 9/07572
 USPC .......... 180/264, 19.1, 19.2, 444, 65.51, 65.6
 See application file for complete search history.

(56) References Cited

U.S. PATENT DOCUMENTS

| | | | | |
|---|---|---|---|---|
| 4,656,409 A | * | 4/1987 | Shimizu | B62D 5/0403 180/444 |
| 4,686,433 A | * | 8/1987 | Shimizu | B62D 5/001 180/444 |
| 4,860,841 A | * | 8/1989 | Sacco | B60D 1/246 180/13 |
| 7,017,689 B2 | | 3/2006 | Gilliland et al. | |
| 7,661,506 B2 | * | 2/2010 | Saito | B62K 5/01 180/444 |
| 7,789,175 B2 | * | 9/2010 | Tobey | B60B 11/06 180/65.1 |
| 2004/0112656 A1 | * | 6/2004 | Bowen | B60K 7/0007 180/65.51 |
| 2007/0034438 A1 | * | 2/2007 | Gotz | B60K 7/0007 180/264 |
| 2011/0094815 A1 | * | 4/2011 | Terry | G21F 5/14 180/264 |
| 2014/0196971 A1 | * | 7/2014 | Stammberger | B60K 17/30 180/252 |
| 2015/0307336 A1 | * | 10/2015 | McVicar | B62D 1/14 180/19.2 |

* cited by examiner

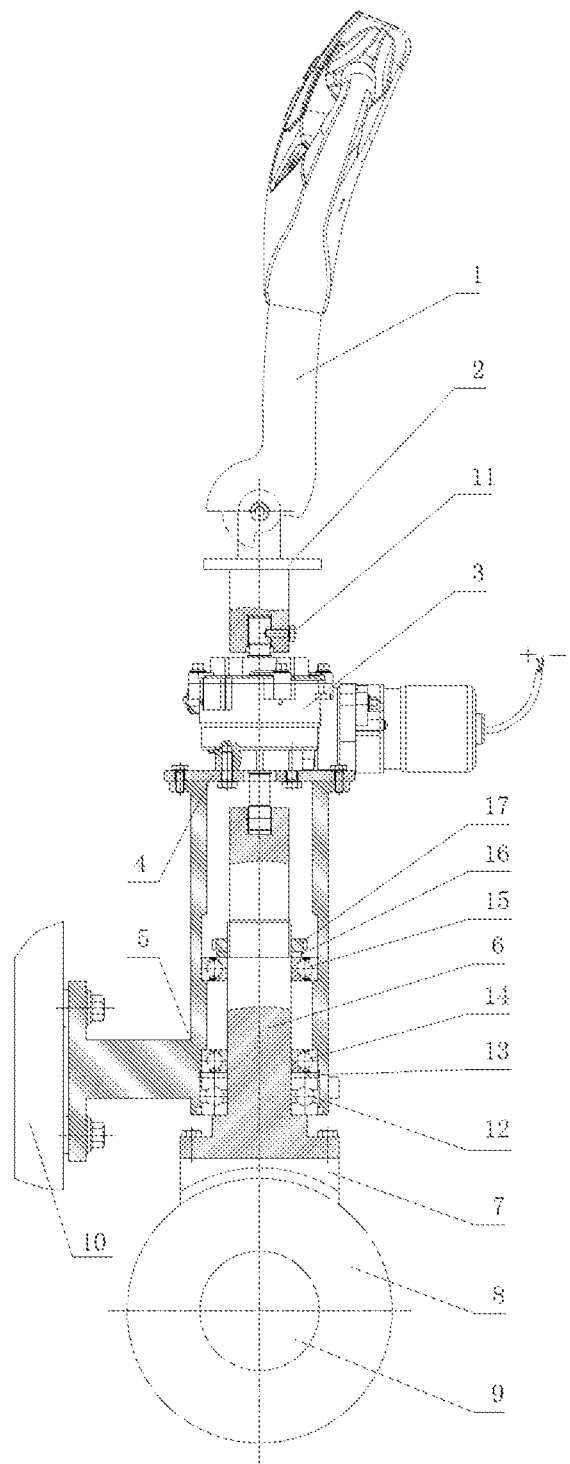

POWER-ASSISTED STEERING MECHANISM OF ELECTRIC PALLET TRUCK

CROSS-REFERENCE TO RELATED APPLICATIONS

This application claims the benefit of priorities to Chinese Patent Applications No. 201810558664.8 and 201820848918.5 both titled "POWER-ASSISTED STEERING MECHANISM OF ELECTRIC PALLET TRUCK", filed with the Chinese State Intellectual Property Office on Jun. 1, 2018, the entire disclosures of which are incorporated herein by reference.

FIELD

The present application relates to power-assisted steering mechanisms of electric pallet trucks, and pertains to the technical field of pallet truck parts.

BACKGROUND

The current pallet trucks are generally steered by driving wheels, however, the driving wheels are required to bear a load with a certain weight, therefore, a large resistance is generated during steering.

In most pallet trucks, the driving wheel is steered by the rotation of a handle. In conventional technology, there are two manners of connection between the handle and the driving wheel. One manner is that the handle is rigidly connected to the driving wheel, in which, the steering force of the driving wheel is completely manually transmitted to the driving wheel through the handle, namely, manual steering. This manner has advantages of low cost, simple structure and high reliability and disadvantages of laborious operation and poor comfortableness. The other manner is that the handle and the driving wheel are connected through electrical signals rather than being rigidly connected, thus, when the handle is rotated, a sensor acquires a steering angle of the handle and transmits it to a controller. The controller gives a command to drive a steering motor, and the steering motor then drives the driving wheel to steer, namely, electric steering. This manner has advantages of a constant steering damping, light and convenient operation and high comfortableness and disadvantages of high cost, complicated structure and poor road feel, moreover, the vehicle may not able to turn once failure occurs.

SUMMARY

A main object of the present application is to provide a power-assisted steering mechanism of an electric pallet truck, which requires a small rotating torque of a handle, is comfortable in operation, has a good road feel, and is steerable even after a power assistor fails, and has a simpler structure and a lower price compared with the electric steering.

The technical solution in the present application is as follows. A power-assisted steering mechanism of an electric pallet truck includes an operating mechanism, a power assistor assembly, a driving mechanism and a mounting bracket. The operating mechanism includes a handle and a handle seat. A lower end of the handle is connected to an upper end of the handle seat. The power assistor assembly includes a power assist mechanism and a controller. The power assist mechanism is electrically connected to the controller. An upper end of the power assist mechanism is provided with an input shaft, and a lower end of the power assist mechanism is provided with an output shaft, and an upper end of the input shaft arranged at the upper end of the power assist mechanism is drivably connected to a lower end of the handle seat. The mounting bracket includes a mounting plate and a mounting seat, and the mounting plate is fixed to an upper end of the mounting seat, the mounting seat is fixedly connected to a vehicle body, and an outer casing of the power assist mechanism of the power assistor assembly is fixedly connected to the mounting plate. The driving mechanism includes a drive connecting shaft, a reduction gearbox, a driving wheel and a driving motor. The drive connecting shaft is rollingly connected to the mounting seat, and an upper end of the drive connecting shaft is drivably connected to a lower end of the output shaft of the power assist mechanism. A lower end of the drive connecting shaft is fixedly connected to an upper end of a housing of the reduction gearbox, and a housing of the driving motor is fixedly connected to the housing of the reduction gearbox. An output shaft of the driving motor is drivably connected to an input shaft of the reduction gearbox, and an output shaft of the reduction gearbox is drivably connected to the driving wheel to further drive the driving wheel to rotate.

Preferably, an output shaft at the lower end of the handle seat is provided with an inner spline; the upper end of the input shaft at the upper end of the power assist mechanism is provided with an outer spline, and the lower end of the output shaft at the lower end of the power assist mechanism is provided with an outer spline; and the upper end of the drive connecting shaft is provided with an inner spline. Correspondingly, the input shaft at the upper end of the power assist mechanism is splinedly connected to the lower end of the handle seat, and the output shaft at the lower end of the power assist mechanism is splinedly connected to the upper end of the drive connecting shaft.

Preferably, the upper end of the mounting seat is bent peripherally outwards. A lower surface of the mounting plate is fitted against and connected to an upper surface of a peripherally outwardly bent portion of the upper end of the mounting seat.

Preferably, the drive connecting shaft is rollingly connected to the mounting seat by an upper deep groove ball bearing, a lower deep groove ball bearing and a thrust ball bearing. The upper deep groove ball bearing is positioned above the lower deep groove ball bearing, and the thrust ball bearing is located below the lower deep groove ball bearing.

Preferably, the lower end of the output shaft arranged at the lower end of the power assist mechanism passes through a corresponding through hole in the mounting plate and is then connected to the upper end of the drive connecting shaft.

The beneficial effects of the present application are as follows. The power assistor assembly is added between the handle and the driving wheel, and the input shaft arranged at the upper end of the power assist mechanism and the output shaft arranged at the lower end of the power assist mechanism in the power assistor assembly are both rigidly connected to corresponding structures, therefore, the following advantages are achieved:

1. compared with the manual steering in the original technology, a small force is simply required to be applied to the handle to drive the driving wheel of the electric pallet truck to steer, which significantly improves the comfortableness of operation;

2. compared with the electric steering in the original technology, due to the employment of the corresponding rigid connection, the steering damping of the handle varies with different working conditions, the road feel is stronger, the hand feel is better, besides, the structure is relatively simple, and manufacturing and maintenance costs can be significantly reduced. More importantly, in the case that the power assistor fails, the corresponding features of rigid connection allow the power-assisted steering mechanism according to the present application to still have capability of steering, i.e., equivalent to the manual steering, thereby can avoid the occurrence of hazards. Therefore, the power-assisted steering mechanism according to the present application is excellent.

BRIEF DESCRIPTION OF THE DRAWINGS

The FIGURE is a schematic view showing the structure of the present application.

REFERENCE NUMERALS IN THE FIGURE

| 1 | handle, | 2 | handle seat, |
|---|---|---|---|
| 3 | power assistor assembly, | 4 | mounting plate, |
| 5 | mounting seat, | 6 | drive connecting shaft, |
| 7 | reduction gearbox, | 8 | driving wheel, |
| 9 | driving motor, | 10 | vehicle body, |
| 11 | set screw, | 12 | thrust ball bearing, |
| 13 | washer, | 14 | lower deep groove ball bearing, |
| 15 | upper deep groove ball bearing, | 16 | washer, |
| 17 | nut. | | |

DETAILED DESCRIPTION

The technical solutions of the present application are further specifically described below through embodiments in conjunction with the drawings.

As shown in the FIGURE, the present application includes an operating mechanism, a power assistor assembly 3, a driving mechanism and a mounting bracket. The operating mechanism includes a handle 1 and a handle seat 2. A lower end of the handle 1 is connected to an upper end of the handle seat 2 in such a way that the lower end of the handle 1 is rotatable with respect to the upper end of the handle seat 2. The power assistor assembly 3 includes a power assist mechanism and a controller. The power assist mechanism and the controller are electrically connected to transmit a corresponding electrical signal. An upper end of the power assist mechanism is provided with an input shaft, and a lower end of the power assist mechanism is provided with an output shaft, and an upper end of the input shaft arranged at the upper end of the power assist mechanism is drivably connected to a lower end of the handle seat 2. The mounting bracket includes a mounting plate 4 and a mounting seat 5, and the mounting plate 4 is fixed at an upper end of the mounting seat 5. The mounting seat 5 is fixedly connected to a vehicle body 10 by bolts. Preferably, the upper end of the mounting seat 5 is bent peripherally outwards. A lower surface at of the mounting plate 4 and an upper surface of a peripherally outwardly bent portion of the upper end of the mounting seat 5 are fitted against each other and fixedly connected by corresponding bolts. An outer casing of the power assist mechanism of the power assistor assembly 3 and the mounting plate 4 are fixedly connected by a bolted connection structure. The driving mechanism includes a drive connecting shaft 6, a reduction gearbox 7, a driving wheel 8 and a driving motor 9. The drive connecting shaft 6 is rollingly connected to the mounting seat 5, and an upper end of the drive connecting shaft 6 is drivably connected to a lower end of the output shaft of the power assist mechanism. A lower end of the drive connecting shaft 6 is fixedly connected to a housing of the reduction gearbox 7 by bolts, and a housing of the driving motor 9 is fixedly connected to the housing of the reduction gearbox 7. An output shaft of the driving motor 9 is drivably connected to an input shaft of the reduction gear box 7, and an output shaft of the reduction gearbox 7 is drivably connected to the driving wheel 8 to further drive the driving wheel 8 to rotate.

The specific structure details of the above reduction gearbox 7 are well-known techniques, and the specific structure details of the three drivable connections are not described herein because they are simple techniques.

Preferably, the drive connecting shaft 6 is rollingly connected to the mounting seat 5 through an upper deep groove ball bearing 15, a lower deep groove ball bearing 14 and a thrust ball bearing 12. The upper deep groove ball bearing 15 is positioned above the lower deep groove ball bearing 14, the thrust ball bearing 12 is located below the lower deep groove ball bearing 14, and the thrust ball bearing 12 and the lower deep groove ball bearing 14 are separated by a washer 13. A lower surface of an outer ring of the upper deep groove ball bearing 15 is supported on a corresponding hole shoulder of an inner hole of the mounting seat 5. The drive connecting shaft 6 is provided with screw threads matching a nut 17 at a corresponding portion. An upper surface of an inner ring of the upper deep groove ball bearing 15 is provided with a washer 16, and the upper deep groove ball bearing 15 is fixed to a mounting position by the cooperation of the nut 17, the washer 16 and the corresponding hole shoulder. An upper surface of an outer ring of the lower deep groove ball bearing 14 is closely fitted against a corresponding hole shoulder of the inner hole of the mounting seat 5, and a lower surface of a seat ring of the thrust ball bearing 12 is supported on a corresponding shaft shoulder at a lower end of the mounting seat 5. The lower end of the output shaft arranged at the lower end of the power assist mechanism passes through a corresponding through hole in the mounting plate 4 and is then connected to the upper end of the drive connecting shaft 6. An output shaft at the lower end of the handle seat 2 is provided with an inner spline, the upper end of the input shaft at the upper end of the power assist mechanism is provided with an outer spline, the lower end of the output shaft at the lower end of the power assist mechanism is provided with an outer spline, and the upper end of the drive connecting shaft 6 is provided with an inner spline. Correspondingly, the input shaft at the upper end of the power assist mechanism is splinedly connected to the lower end of the handle seat 2, and the corresponding connection is locked by a set screw 11, and the output shaft at the lower end of the power assist mechanism is splinedly connected to the upper end of the drive connecting shaft 6.

The working principle of the present application is as follows: in the case that the power assistor assembly 3 is working normally, when an operator rotates the handle 1 about an axis of the handle seat 2, the handle seat 2 transmits the rotating torque to the input shaft of the power assist mechanism of the power assistor assembly 3 through the splines. With the power-assist effect of the power assistor assembly 3, a greater torque can be outputted by the output shaft of the power assist mechanism of the power assistor assembly 3, thereby, the torque is transmitted to the drive connecting shaft 6 by the splines, to finally steer the driving wheel. In this way, the operator is simply required to input a small force, the steering of the driving wheel may just be easily achieved, which, compared with the electric steering in the conventional technology, may achieve the similar power-assist effect and can further provide a more intuitive road feel and a more suitable hand feel. In the case that the power assistor assembly 3 fails, when the operator rotates the handle 1 about the axis of the handle seat 2, the handle seat 2 may just transmit the rotating torque to the input shaft of the power assist mechanism of the power assistor assembly 3 through the splines. Thus, though the power assistor assembly 3 fails, an equivalent torque can be outputted, through an internal mechanical structure, at the output shaft of the power assist mechanism of the power assistor assembly 3, and thereby, the torque is transmitted to the drive connecting shaft 6 by the splines, to finally steer the driving wheel. In this way, the situation in which the power assistor assembly 3 fails is equivalent to the manual steering in the conventional technology, and the moment provided by the operator is equal to the moment of resistance of the driving wheel in the practical rotation, moreover, no dangerous situation may occur.

The specific embodiments described above are only preferred embodiments of the present application, and are not intended to limit the specific implementation structure and scope of the present application. In fact, some equivalent variations may be made according to the shapes, structures, and design objects of the present application. Accordingly, all the equivalent variations made according to the shapes, structures, and design objects of the present application should be covered in the scope of protection of the present application, that is, all these equivalent variations should be protected by the present application.

What is claimed is:

1. A power-assisted steering mechanism applicable to an electric pallet truck, comprising:
    an operating mechanism;
    a power assistor assembly;
    a driving mechanism; and
    a mounting bracket; wherein
    the operating mechanism comprises a handle and a handle seat, a lower end of the handle is connected to an upper end of the handle seat;
    the power assistor assembly comprises a power assist mechanism and a controller, and the power assist mechanism is electrically connected to the controller; an upper end of the power assist mechanism is provided with an input shaft, a lower end of the power assist mechanism is provided with an output shaft, and an upper end of the input shaft arranged at the upper end of the power assist mechanism is drivably connected to a lower end of the handle seat;
    the mounting bracket comprises a mounting plate and a mounting seat, the mounting plate is fixed to an upper end of the mounting seat, the mounting seat is fixedly connected to a vehicle body, and an outer casing of the power assist mechanism of the power assistor assembly is fixedly connected to the mounting plate;
    the driving mechanism comprises a drive connecting shaft, a reduction gearbox, a driving wheel and a driving motor, the drive connecting shaft is rollingly connected to the mounting seat, an upper end of the drive connecting shaft is drivably connected to a lower end of the output shaft of the power assist mechanism, and a lower end of the drive connecting shaft is fixedly connected to an upper end of a housing of the reduction gear box;
    a housing of the driving motor is fixedly connected to the housing of the reduction gearbox; an output shaft of the driving motor is drivably connected to an input shaft of the reduction gearbox, and an output shaft of the reduction gearbox is drivably connected to the driving wheel to further drive the driving wheel to rotate.

2. The power-assisted steering mechanism according to claim 1, wherein an output shaft at the lower end of the handle seat is provided with an inner spline; the upper end of the input shaft at the upper end of the power assist mechanism is provided with an outer spline, and the lower end of the output shaft at the lower end of the power assist mechanism is provided with an outer spline; and the upper end of the drive connecting shaft is provided with an inner spline; correspondingly, the input shaft at the upper end of the power assist mechanism is splinedly connected to the lower end of the handle seat, and the output shaft at the lower end of the power assist mechanism is splinedly connected to the upper end of the drive connecting shaft.

3. The power-assisted steering mechanism according to claim 2, wherein the lower end of the output shaft arranged at the lower end of the power assist mechanism passes through a corresponding through hole in the mounting plate and is then connected to the upper end of the drive connecting shaft.

4. The power-assisted steering mechanism according to claim 1, wherein the upper end of the mounting seat is bent peripherally outwards; and a lower surface of the mounting plate is fitted against and connected to an upper surface of a peripherally outwardly bent portion of the upper end of the mounting seat.

5. The power-assisted steering mechanism according to claim 4, wherein the lower end of the output shaft arranged at the lower end of the power assist mechanism passes through a corresponding through hole in the mounting plate and is then connected to the upper end of the drive connecting shaft.

6. The power-assisted steering mechanism according to claim 1, wherein the drive connecting shaft is rollingly connected to the mounting seat by an upper deep groove ball bearing, a lower deep groove ball bearing and a thrust ball bearing; the upper deep groove ball bearing is positioned above the lower deep groove ball bearing, and the thrust ball bearing is located below the lower deep groove ball bearing.

7. The power-assisted steering mechanism according to claim 6, wherein the lower end of the output shaft arranged at the lower end of the power assist mechanism passes through a corresponding through hole in the mounting plate and is then connected to the upper end of the drive connecting shaft.

8. The power-assisted steering mechanism according to claim 1, wherein the lower end of the output shaft arranged at the lower end of the power assist mechanism passes through a corresponding through hole in the mounting plate and is then connected to the upper end of the drive connecting shaft.

* * * * *